Nov. 8, 1938.  J. H. LIEBER  2,135,903
COFFEE MAKING APPARATUS
Filed March 20, 1936
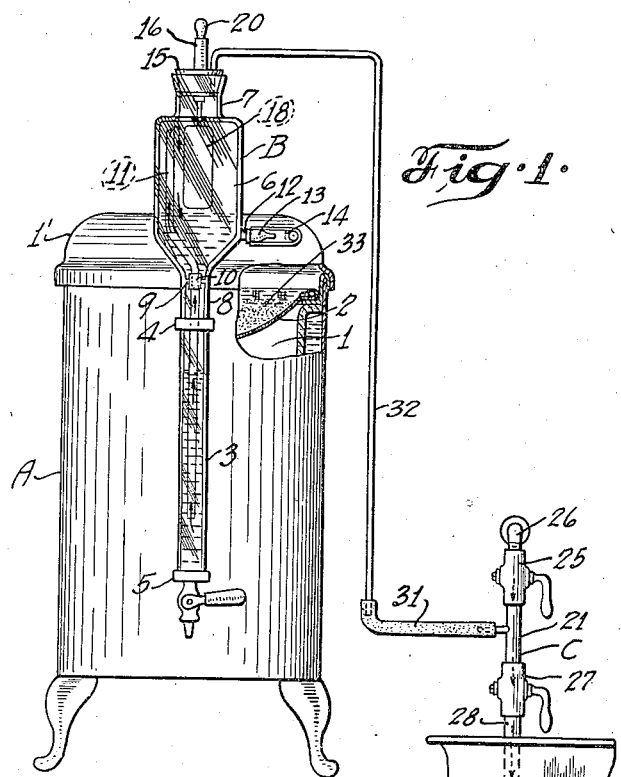
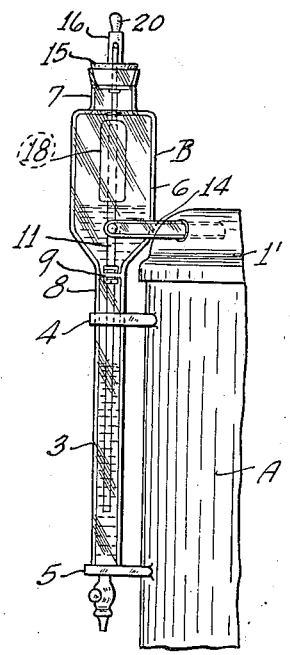
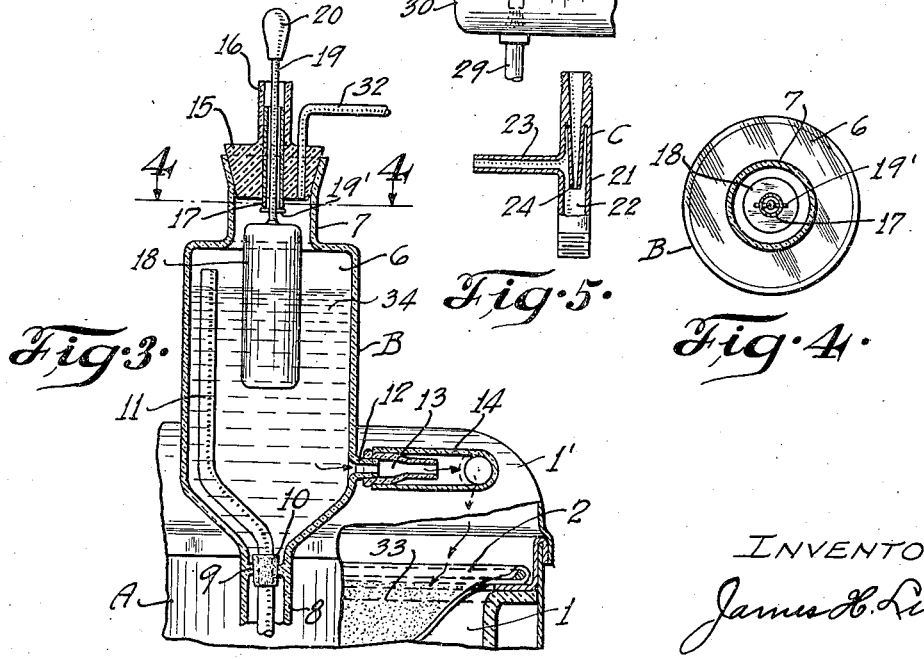
INVENTOR
James H. Lieber Patented Nov. 8, 1938

2,135,903

UNITED STATES PATENT OFFICE 2,135,903

COFFEE-MAKING APPARATUS

James H. Lieber, St. Louis, Mo.

Application March 20, 1936, Serial No. 69,874

3 Claims. (Cl. 53—3)

This invention relates generally to coffee-making apparatus, and has more particularly reference to coffee-making apparatus for brewing drip-coffee in relatively large quantities, as in coffee-urns, and the like.

Heretofore so far as I am aware, it has been customary, when brewing drip coffee in an urn, to draw a portion of the liquid from the bottom of the urn into a more or less open vessel, remove the cover of the urn and pour the liquid thereunto for percolation of the liquid through the coffee-material suspended in the urn by means of a basket bag, or the like.

This procedure, which is commonly known in the art as "repouring" the coffee, results, in the first instance, in a loss of aroma in the coffee-brew, which escapes as steam from the pouring vessel, and, in the second instance, results in a loss of heat from the liquid being repoured, necessitating a stronger boiling of the coffee-liquid in the urn, with consequent deleterious formation of tannic acid and the like, which in turn imparts a bitter taste and unwholesomeness to the coffee.

Having the foregoing in mind, my invention has for its prime object the provision of a simple and inexpensive device, readily attachable to a coffee-urn, for the automatic repouring or circulation of the coffee-liquid from the bottom to the top of the urn through a substantially closed conduit, thereby avoiding, both, the loss of aroma, and heat, from the circulated liquid, with consequent improvement in the quality and economy in the making of the coffee-brew.

And with the foregoing and other objects in mind, my invention resides in the novel features of form, construction, arrangement, and combination of parts hereinafter described and pointed out in the claims.

In the accompanying drawing,—

Figure 1 is a front elevational view, partly broken away and in section, of a coffee-urn equipped with the apparatus of my invention;

Figure 2 is a fragmentary side elevational view thereof, the aspirating apparatus being removed;

Figure 3 is a vertical fragmentary sectional view of the suction-tank of the device, a fragmentary portion of the coffee-urn, partly broken away and in section, being also shown;

Figure 4 is a sectional view taken approximately along the line 4—4, Figure 3; and Figure 5 is a detail sectional view of the aspirating element.

Referring now more in detail and by reference characters to the drawing, which illustrates a preferred embodiment of my invention, A designates generally a conventional form of coffee-urn, or coffee-making apparatus, including a coffee-liquid receptacle 1 equipped with a removable cover or dome 1' and having in its upper portion a coffee-basket 2, the urn A being equipped with a vertical tubular or hollow gauge-glass 3 which at its opposite ends is supported, and likewise communicated with the upper and lower portions of the receptacle 1, by respective upper and lower brackets 4, 5, as will be understood by those skilled in the art.

B designates a tank or suction-chamber disposed in elevated position relatively to the normal level of the liquid to be maintained in the receptacle 1, the tank B being preferably formed of a suitable sanitary material, as glass or the like, and comprising an enlarged body-portion 6 provided in its upper wall with a closure-receptive neck 7, and at its lower end terminating in a reduced tubular portion 8 adapted to be removably yet sealingly seated on the bracket 4 for communication with the gauge-glass 3.

The tubular portion 8 is provided with an interior perforated partition 9, in which is fitted a cork 10, or the like, and, in turn through the cork 10 is fitted a vertical conduit or preferably glass tube 11 which at its upper end extends substantially into and communicates with the upper portion of the tank, B, and at its lower end terminates adjacent the lower portion of, and communicates with, the gauge-glass 3.

Extending laterally from a side of the tank B is an outlet or discharge nozzle 12 communicating with the lower portion of the tank B, and on the exterior end of the nozzle 12 is mounted a non-return or check-valve device 13, preferably composed of a flattened rubber tube which at one end is expanded over the nozzle 12 and at its other or free end provides a pair of tightly fitting lips which act to permit gravity flow of liquid only outwardly from the tank B, while preventing, on the other hand, reverse flow of air into the tank B, for a purpose presently more fully appearing.

In turn, the check-tube 13 is tightly fitted into, and so forms a removable seal, between the nozzle 12 and a pipe or conduit 14 which extends into the urn cover 1' for communicating with the upper portion of the receptacle 1 above the coffee-basket 2.

Fitted into the neck 7 is a removable closure 15, as a rubber cork or the like, having an upstanding tubular or hollow mouth piece extension 16, also of rubber or similar elastic material, whose open end forms a resilient valve-seat, as will presently more fully appear, and a tubular bushing member 17, preferably of glass or other sanitary material, is inserted through the cork 15 for extending partially into the bore of the mouthpiece 16 and likewise for communicating the same with the interior of the tank B.

Disposed in the interior of the tank B is a liquid level responsive buoyant member or float 18, having an upstanding stem or rod 19 freely movable vertically in and through the bushing 17 and the mouthpiece 16, the rod 19 having a transverse pin 19' for limiting the upward movement of the rod 19 in the bushing 17.

At its upper or free end, the rod 19 carries a, preferably rubber, conical body or valve-member 20, which, when the float 18 drops in the tank B responsive to fall of liquid level therein, is adapted to become more or less wedgingly engaged with the walls of the open end of the mouthpiece 16 for sealing the same against access of air thereinto and hence also into the tank B.

When the conical valve 20 engages the mouthpiece 16, the elastic walls thereof yieldingly expand and grip or so frictionally engage the valve 20 as to impart to the latter a reluctance to disengagement from the mouthpiece 16, in a manner to substantially or temporarily retard or delay the upward movement of the float 18 responsive to rise of liquid level in the tank B.

Hence, the float 18 is required to have a deeper immersion in the rising liquid, and the liquid must assume a higher level in the tank B, than would be required to merely move the float 18, in order that the float may acquire an excess buoyancy, as it may be said, for effecting release of the valve 20 from its frictional engagement with the walls of the mouthpiece 16.

C designates a suction-pump or aspirator of the water-actuated type, comprising in the usual manner a body member 21 having a mixing chamber 22, a suction chamber communicating with the chamber 22, and here designated as suction inlet 23, and an aspirator nozzle 24 communicating with the water-inlet end of the body 21 for discharging into the chamber 22 past the inlet 23.

Communicating with the water-inlet end the body 21 is a shut-off valve or cock 25 which in turn communicates with a suitable source of hydraulic pressure supply or water pipe 26, and communicating with the chamber 22 at the discharge end of the body 21 is a shut-off valve or cock 27 communicating in turn with a tail-pipe 28 for free discharge of the mixture of water and entrained air from the chamber 22 into a suitable drain, as the drain-pipe 29 of a kitchen sink 30, or the like.

Communicating with the suction inlet 23, preferably detachably as through a length of flexible tubing 31, is a suction conduit 32, which extends to and through the cork 15 for, in turn, communicating the interior of the tank B with the aspirator chamber 22.

In the use and operation of my invention, the receptacle 1 is first filled with the requisite amount of water by closing the cock 27, and opening the cock 25 for admitting water from the pipe 26 into the chamber 22, the water thence flowing through the conduit 32 into the tank B and from thence through either or both the conduits 11 and 14 into the receptacle 1.

When the requisite amount of water is in the receptacle 1, the cock 25 is closed, and the tank B and its appendages may be removed from the urn A, in an obvious manner, to such necessary extent as to permit the removal of the cover 1' in order that the coffee-material, as 33, may be placed in the basket 2, after which the cover 1' and tank B are replaced on the urn A, and means of any suitable kind is employed to bring the water in the receptacle 1 to the desired degree of temperature.

Then the cocks 25 and 27 are opened for effecting rapid flow of water through the aspirator C, whereupon the tank B is placed under a suction which closes the check-valve 13 and acts to induce a flow of, or draw, the hot water or coffee-liquid, as the case may be, from the lower portion of the receptacle 1, through the bracket 5, gauge glass 3, and conduit 11 for discharge of the coffee-liquid therefrom into the tank B.

As the coffee-liquid, as 34, rises in the tank B, the float 18 ultimately acquires sufficient buoyancy to effect disengagement of the valve 20 from the mouthpiece 16, and to move upwardly for carrying the valve 20 a substantial distance above the mouthpiece 16 until the pin 19' engages the bottom of the bushing 17 for preventing the float 18 from obstructing flow of air therethrough, which air entering the tank B breaks, as it may be said, the suction effect of the aspirator C on the contents of the tank B.

At such time, the level of the liquid 34, while substantially above the normal level of the coffee-liquid in the receptacle 1, is yet below the discharge end of the conduit 11, consequently the liquid 34 can only flow from the tank B through the outlet 12. Consequently, air being free to enter the tank B on opening of the valve 20, the liquid contents 34 in the tank B become free to flow by gravity from the tank B, through the check 13, and thence through the conduit 14, into the upper portion of the receptacle for percolation of the so-circulated liquid 34 through the coffee-material 33 in the basket 2 and back into the receptacle 1.

As has been said, the float 18 has an excess buoyancy which, as soon as the valve 20 is released from the mouthpiece 16, causes the float 18 to rise to such extent as to lift the valve 20 a substantial or excess distance above the mouthpiece 16, and this distance of excess lift of the valve 20 measures or determines the amount of inducted liquid that will flow from the tank B into the receptacle 1 until the level of the liquid in the tank B falls sufficiently for lowering the float 18 until the valve 20 will again engage the mouthpiece 16 for sealing the tank B and placing the same under the suction of the aspirator C.

The foregoing described circulatory cycle of alternately intermittently inducing flow of the coffee-liquid from the receptacle 1 to the tank B and from the tank B to the receptacle 1 for percolation of the liquid through the coffee material 33, is repetitively continued as long as the aspirator C is in suction-producing actuation, the amount of coffee-liquid repoured at each cycle being determined, as has been said, by the amount of rise of the liquid in the tank B required to over-balance the resistance of the valve 20 to opening actuation thereof.

Hence, as will be seen, by changing the level of the conical valve 20, or by otherwise increasing or decreasing the frictional engagement thereof with the mouthpiece 16, the amount of liquid recirculated by each cycle of the repouring operation may be readily varied as may best suit the intended purpose.

It will be understood that changes and modifications in the form, construction, arrangement, and combination of several parts of my improved coffee-making apparatus may be made and substituted for those herein shown and described without departing from the nature and principle of my invention.

Having thus described my invention, what I claim and desire to secure by Letters Patent is,—

1. In combination with a coffee urn gauge glass, a tank at the upper end of the glass, a coffee liquid eduction tube extending from a point within the upper portion of the tank to depend into the glass, a suction line communicating with the upper portion of the tank, an urn communicating outlet from the lower portion of the tank, a float operative in the tank, and a valved vent in the upper portion of the tank controlled by the said float.

2. In combination with a coffee urn gauge glass, a tank at the upper end of the glass, a coffee liquid eduction tube extending from a point within the upper portion of the tank to depend into the glass, a suction line communicating with the upper portion of the tank, an urn communicating outlet from the lower portion of the tank, a float operative in the tank, and a valved vent in the upper portion of the tank controlled by the said float, said valved vent consisting of an opening in the upper portion of the tank and a resilient valve element capable of sticking in the opening when the float reaches a predetermined low position.

3. In combination with a coffee urn gauge glass, a tank at the upper end of the glass, a coffee liquid eduction tube extending from a point within the upper portion of the tank to depend into the glass, a suction line communicating with the upper portion of the tank, an urn communicating outlet from the lower portion of the tank, a float operative in the tank, and a valved vent in the upper portion of the tank controlled by the said float, said tank being provided with a removable closure at its upper portion through which the suction line communicates with the upper portion of the tank, said valvular vent consisting of an opening in the closure, a rod extending through the opening and secured to the float, and a valve element of wedge-shaped construction at the upper end of the rod and being adapted to wedge into the opening when the float is in a predetermined low position.

JAMES H. LIEBER.